UNITED STATES PATENT OFFICE.

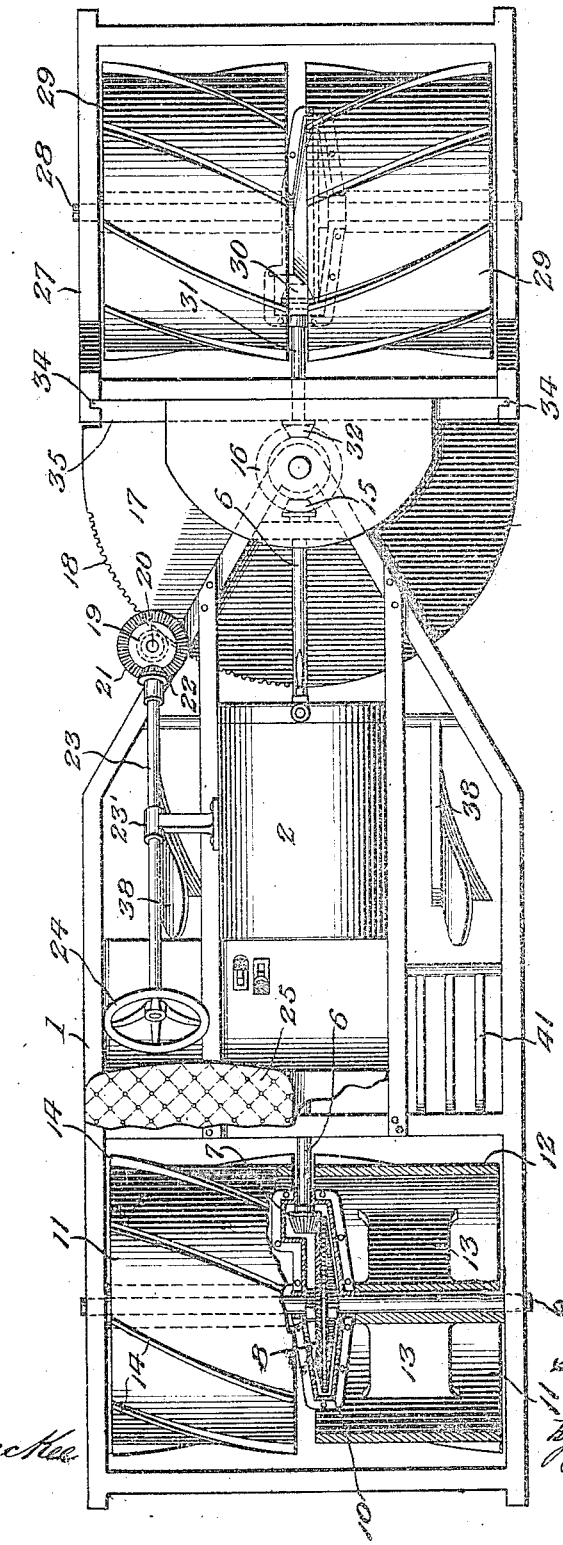

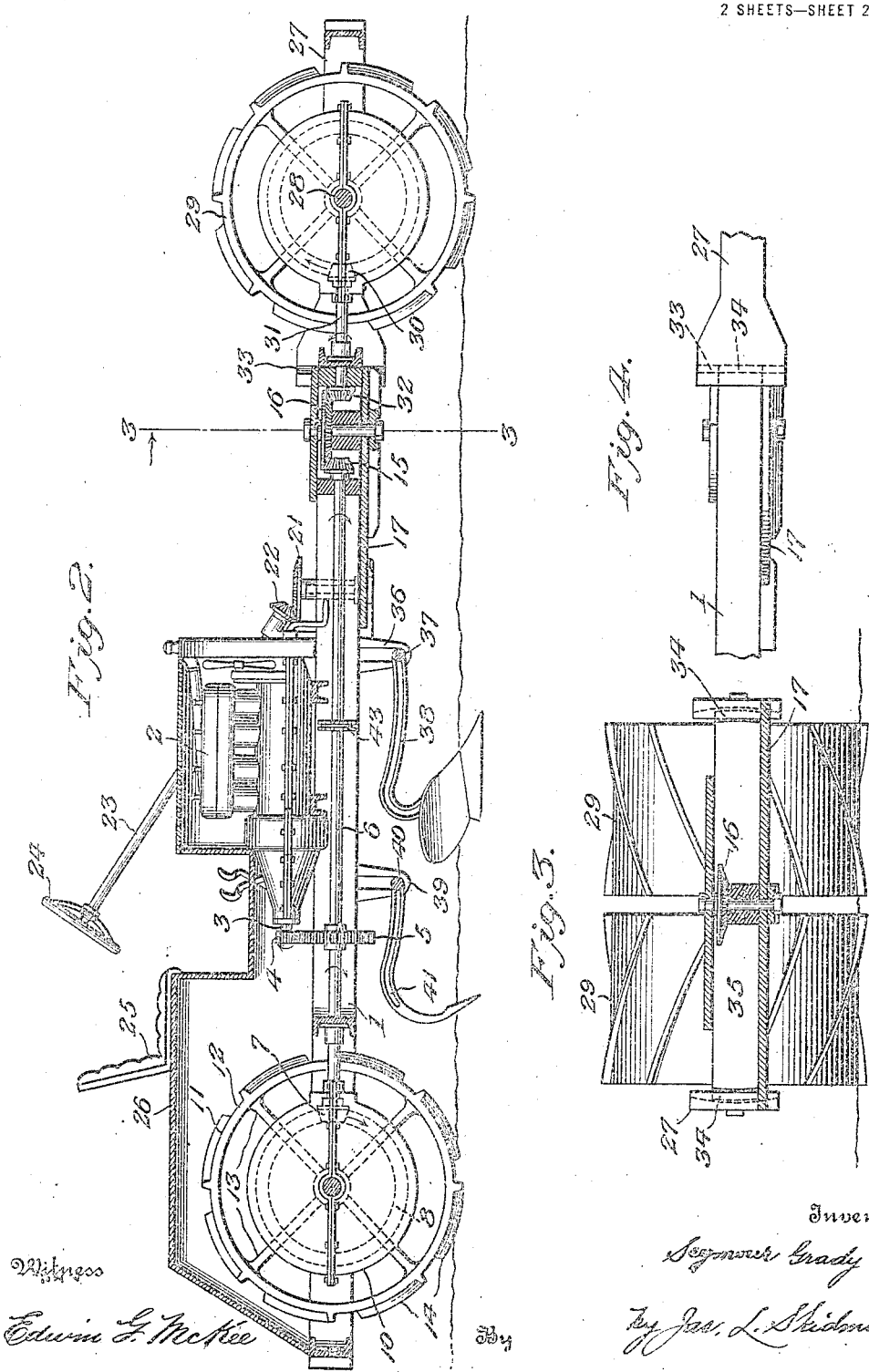

SEYMOUR GRADY, OF PALATKA, FLORIDA.

TRACTION ENGINE OR VEHICLE.

1,294,791.   Specification of Letters Patent.   Patented Feb. 18, 1919.

Application filed December 13, 1917. Serial No. 206,961.

*To all whom it may concern:*

Be it known that I, SEYMOUR GRADY, a citizen of the United States, residing at Palatka, in the county of Putnam and State of Florida, have invented certain new and useful Improvements in Traction Engines or Vehicles, of which the following is a specification.

My invention relates to a traction engine or vehicle which is capable of general use, but is especially designed for agricultural purposes and to which various kinds of farm implements may readily be applied.

The prime object of the invention is to provide a simple, strong, durable, economical and thoroughly efficient traction vehicle, capable of performing a maximum number of functions with a minimum number of parts from which the vehicle is constructed.

A further object is to provide a vehicle of the character mentioned which will successfully operate any kind or type of farm implement that can be drawn by a horse or a motor.

A further object of the invention is to provide means whereby the power can be directly transmitted to the drive wheels upon which it operates.

A further object is to provide means whereby the driving power of the said vehicle may be utilized for cutting hay, and for conveying power to drive and operate various kinds of machines and implements for many purposes.

Still further objects of the invention are to so construct both the front and rear supporting wheels that they will serve as drive wheels; to provide means whereby the front frame is adjustable with respect to the rear frame so as to permit the front drive wheel to ride over uneven earth surfaces without imparting strain to the rear frame and the driving mechanism carried thereby; to provide efficient steering mechanism supported by the rear frame, and to provide a vehicle capable of hauling heavy loads over plowed ground or muddy roadways.

The foregoing and such other objects as may appear from the ensuing description are attained by the novel construction, combination, location and arrangement of the parts hereinafter more fully described, illustrated in the accompanying drawings, and particularly pointed out in the claims appended hereto, it being understood that slight changes in the form, proportions and minor details of the construction may be resorted to without departing from the spirit or sacrificing any of the advantages of the invention.

In the accompanying drawings which form a part of the specification it will be seen that:—

Figure 1, is a plan view of the improved traction-engine or vehicle embodying my invention.

Fig. 2, is a longitudinal sectional elevation of the same.

Fig. 3, is a transverse sectional view, taken on the line 3—3, Fig. 2, looking in the direction of the arrow, and Fig. 4, is a detail side view showing a portion of the front end of the rear frame and a portion of the rear end of the front frame of the vehicle, said portions of the frame being joined together.

Similar numerals of reference are employed to designate corresponding parts throughout the several figures of the drawings.

In carrying out the invention as illustrated and which shows a preferred construction, the numeral 1 represents the rear frame of the vehicle made of any suitable material, which is provided with suitable transverse and longitudinal connecting members, said frame carrying and supporting any suitable or desirable construction of motor, as for example a gasolene-motor 2. The motor is provided with a motor shaft 3, having fixedly secured to its rear end portion a gear-wheel 4, which meshes with the gear wheel 5 movably or rigidly secured to the rear drive shaft 6, having fixedly secured thereto at its rear end a bevel-gear wheel 7 which engages with a rear drive-gear 8 rigidly secured to the rear axle 9, said gear 8 being inclosed by a cylindrical casing 10 constructed and supported in any suitable or desirable manner. The rear axle 9 is passed through suitable bearings formed in the rear frame 1, and fixedly secured to the said axle are the rear cast iron drive wheels 11, each wheel being provided with a solid outer rim 12, integral spokes 13, and a series of integral diagonally arranged ribs 14, formed across the outer surface of the rim for the purpose of increasing the tractive power of the wheels.

At the front end of the drive-shaft 6 is fixedly secured a bevel-gear 15 which meshes with the under side of a bevel drive gear 16, at the rear side thereof, said gear 16 being suitably supported and carried by the front portion of the rear frame 1, said frame carrying at its front end a semi-circular member 17 of any suitable material preferably sheet or plate steel provided on its peripheral portion with gear teeth 18 adapted to engage with the gear wheel 19 fastened to the lower end of an upright shaft 20, said shaft having fixedly secured to its upper end a bevel gear 21, adapted to mesh with the bevel gear 22, rigidly fixed to the front end of the steering shaft 23, provided with a hand wheel 24 at its rear end for the purpose of manipulating the steering gear by the operator from a seat 25, formed on a platform or casing 26 supported upon the rear frame, said steering shaft 23 being suitably supported in its proper position by a bracket 23ˣ carried by the rear frame.

The numeral 27 designates the front frame member of the vehicle and is formed of any suitable or desirable material possessing the requisite strength, provided with suitable bearings for supporting therein the front axle 28, to which are secured the front drive wheels 29, of the same construction as the rear drive wheels hereinbefore described. To the front axle is fixedly secured a front drive-gear wheel inclosed by a casing of the same type as the rear drive gear and casing, and meshing with said front drive gear is a bevel gear 30, fixedly secured to the front end portion of the front drive-shaft 31, and to the rear end of said shaft 31 is rigidly fixed a bevel gear 32, adapted to engage the front under side portion of the drive gear 16, for the purpose of imparting the necessary driving power to the front drive wheels 29.

The rear portion of the front frame 27 is provided at each side thereof with a vertical groove 33 which is deeper at its central portion than at its upper and lower end, to which is fitted the curved end flanged ends 34 of an adjustable frame member 35 to permit the said frame member to automatically adjust itself to any of the uneven surfaces of the ground over which the front drive wheels are caused to travel without imparting undue strain to the rear frame and the driving mechanism carried thereby.

Secured to the rear frame 1 are suitable depending hangers 36 adapted to receive a shaft 37 to which shaft may be secured in any desirable manner a suitable number of plows 38, and adjustably secured to a depending hanger 39, is a shaft 40 to which is attached any desirable number of cultivator blades or shovels 41 for the purpose of plowing and cultivating the soil.

It will be understood that the frame may be provided with hangers secured to the rear portion and sides thereof adapted to connect with any suitable farm implement to be utilized for agricultural purposes.

To the rear drive shaft, at any suitable point, preferably beneath the engine is secured in any desirable manner a sprocket gear wheel 43, which may be utilized when connected with the well known sprocket chain for the purpose of driving various kinds of machines, tools and farming implements attached thereto.

It will thus be readily perceived that my improved traction engine or vehicle may be employed for various purposes, and may be made of such sizes as are required for both light and extra heavy work.

Having thus described my invention, what I claim and desire to secure by Letters Patent is:—

1. A traction engine or vehicle comprising a front and a rear frame vertically adjustable with respect to each other, an engine drive-shaft carrying a gear-wheel, a front and rear longitudinal drive shaft, a bevel gear mounted on the rear frame intermediate said shafts, and each shaft having a bevel gear at each end, the bevel gear at the rear end of the rear shaft engaging with the bevel gear carried by the rear axle and the bevel gear at its front end meshing with the bevel gear mounted on the rear frame, and the bevel gear at the front end of the front shaft engaging with a bevel gear secured to the front axle while the bevel gear at the rear end of the front shaft meshes with the bevel gear on the rear frame.

2. A traction engine or vehicle comprising a front and a rear frame vertically adjustable with respect to each other, an engine drive-shaft carrying a gear wheel, a longitudinal rear drive shaft provided at its rear end with a bevel gear engaging a gear wheel secured to the rear axle and at its front end with a bevel gear engaging a bevel gear mounted on the rear frame at the forward end thereof, and a front longitudinal drive shaft with its front end engaging a gear secured to the front axle and its rear end provided with a bevel gear meshing with said gear mounted on the rear frame.

3. A traction engine or vehicle comprising a front and a rear frame vertically adjustable with respect to each other, a front and a rear drive shaft arranged in longitudinal alinement, each shaft having a bevel gear at each end thereof, a bevel gear mounted at the forward end of the rear frame between the ends of said shafts engaging with a bevel gear at the front end of the rear shaft and at the rear end of the front shaft, and an engine shaft for imparting driving power to each of said drive shafts.

4. A traction engine or vehicle comprising a front and a rear frame vertically adjustable with respect to each other, said rear frame carrying a longitudinal drive shaft having a bevel gear at its rear end engaging with a bevel gear carried by the rear axle and a bevel gear at its front end meshing with a bevel gear mounted near the front end of the rear frame, and the front frame carrying a longitudinal drive shaft provided with a bevel gear at its front end engaging with a bevel gear carried by the front axle and a bevel gear at its rear end meshing with said bevel gear mounted on the rear frame.

5. A traction engine or vehicle comprising front and rear drive wheels, a front and rear frame vertically adjustable with respect to each other, a bevel gear mounted on the rear frame, a front and rear shaft, each of said shafts being provided at one end with a bevel gear engaging with the bevel gear mounted on the rear frame, a semi-circular member secured to the rear frame provided with a rear peripheral toothed portion, and steering gear secured to the rear frame for engaging said toothed portion.

6. A traction engine or vehicle comprising a front and a rear frame vertically and automatically adjustable with respect to each other, front and rear drive wheels and axles, a bevel gear fixedly secured to each axle, a longitudinal drive shaft adapted to engage the rear drive gear, a longitudinal drive shaft engaging the front drive gear, a bevel gear mounted at each end of each longitudinal shaft, and an intermediate bevel gear mounted on the rear frame between the forward end of one shaft and the rear end of the other shaft adapted to mesh with the bevel gear on one end of each of said shafts.

7. A traction engine or vehicle comprising front and rear drive wheels and axles, a front and a rear frame vertically and automatically adjustable with respect to each other, said front frame being provided with vertical grooves at each side of its rear end portion adapted to receive the extension formed at each side of the front end portion of the rear frame, and means connected to both frames for imparting motion to said drive-wheels.

8. A traction engine or vehicle comprising front and rear drive wheels and axles, a front and a rear frame vertically adjustable with respect to each other, a rear driveshaft provided with a sprocket wheel fixedly secured thereto intermediate its length and a bevel gear at each end, a front drive shaft having a bevel gear at each end, an intermediate drive gear mounted on the rear frame and engaging with a bevel gear at one end of each of said shafts, and means for driving said shafts.

9. A traction engine or vehicle comprising front and rear drive wheels and axles, a front and a rear frame vertically adjustable with respect to each other, a drive gear fixedly secured to each axle, a front and a rear drive shaft located in alinement with each other, a bevel gear secured to each end of both the front and the rear drive shafts, an intermediate drive gear mounted in the rear frame engaging a bevel gear at one end of each of the drive shafts, and a sprocket gear, fixedly secured to the rear drive shaft intermediate its length.

SEYMOUR GRADY.